May 27, 1958 R. F. DAVIS ET AL 2,836,024
MULCHING LAWNMOWER
Filed Aug. 24, 1956

RAY FRANCIS DAVIS,
ROBERT E. FREDERICKSON,
INVENTORS.

BY
Attorney

United States Patent Office 2,836,024
Patented May 27, 1958

2,836,024
MULCHING LAWNMOWER

Ray Francis Davis, Los Angeles, and Robert E. Frederickson, South Gate, Calif., assignors to McCulloch Motors Corporation, Los Angeles, Calif., a corporation of Wisconsin Application August 24, 1956, Serial No. 606,095

3 Claims. (Cl. 56—25.4)

This invention relates to lawn mowers and relates in particular to a simple mulching lawn mower which effectively reduces the cuttings to such fine form that they will settle down between the growth or grass stems over which the mower has been operated.

It is an object of the invention to provide a mulching lawn mower having a simple cutter means arranged to be rotated in an approximately horizontal plane parallel to and spaced from the turf, and stationary cutters arranged in a circle above the circular path of movement of the revolving cutter means, cooperating with the revolving cutter means to reduce the cuttings to fine form.

It is an object of the invention to provide a mower having cutter means revolved in an approximately horizontal and circular plane the periphery or margin of which is defined by the outer end of the cutter means, and a circular wall extending from a circle which lies in proximity to the periphery of the circular horizontal plane of the revolving cutter means, there being a top wall extending from the upper portion of the circular wall inwardly toward the axis of rotation of the cutter means, cooperating with the circular wall to define a space above the path of movement of the cutter means in which space the stationary cutters are located. The stationary cutters are arranged in a circle and are positioned close to the circular approximately horizontal plane in which the revolving cutter means rotate.

It is a further object of the invention to provide deflector means in following relation to the cutter means for throwing the cuttings upwardly toward the stationary cutters and into the space contiguous to and between the stationary cutter means.

The circular wall defines a space in which the cut grass and leaves are entrapped between the cutter means and the top wall which extends inwardly from the upper portion of the circular wall. The stationary cutter blades or vanes provide backstops for preventing rotation of the cuttings with the cutters and therefore to hold the cuttings substantially stationary while the revolving cutters act upon them to reduce them to fine form. Grass and leaves are maintained in the cutting chamber above the revolving cutter until they are reduced to such fine form that they will sift down into the turf.

Further objects and advantages of the invention may be brought out in the following part of the specification wherein small details have been described for the purpose of competence of disclosure, without intending, however, to limit the scope of the invention which is defined by the appended claims.

Referring to the accompanying drawings which are for illustrative purposes only:

Figure 1:
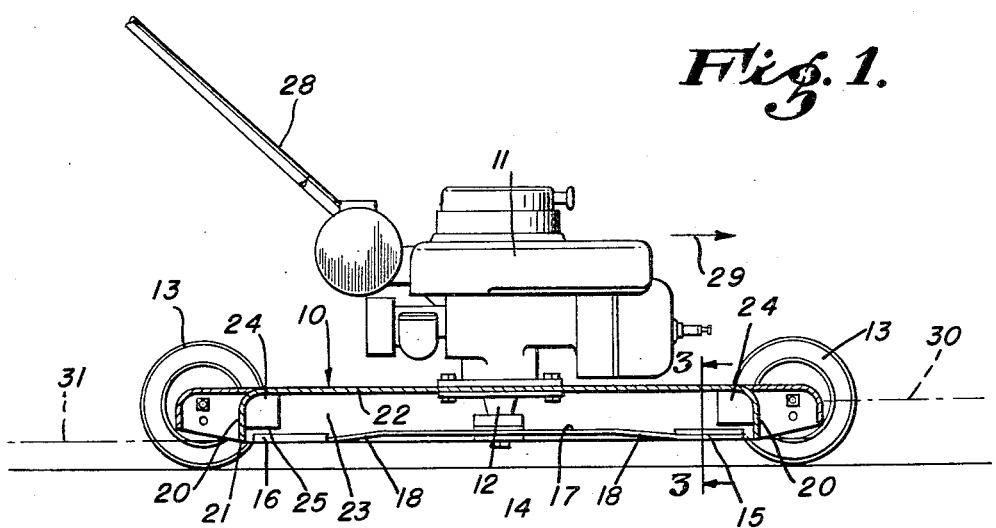
Fig. 1 is an elevational view, in partial section, of a preferred form of the invention.
Figure 2:
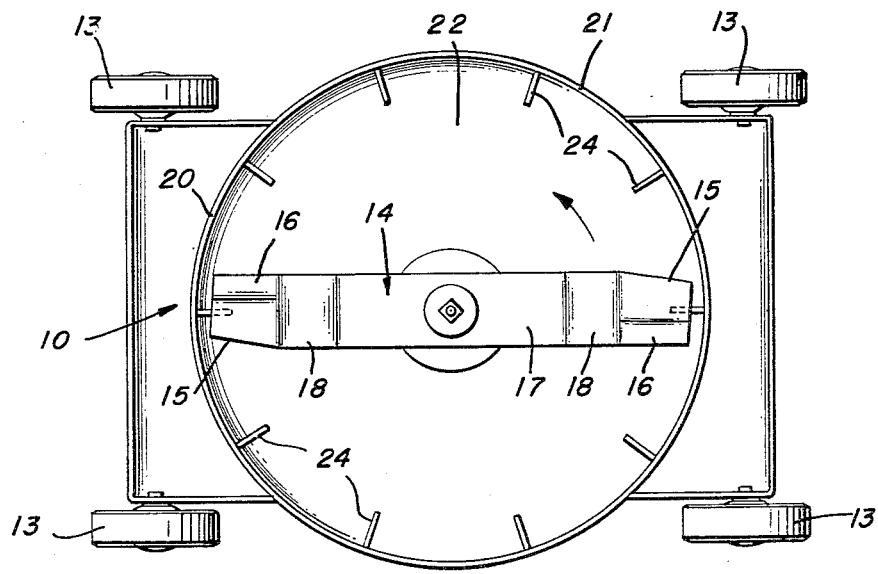
Fig. 2 is a bottom plan view of the mower shown in Fig. 1.

The mower includes a wheeled carriage 10 arranged to be moved over the lawn to be cut. The carriage 10 supports power means shown as a small gasoline engine 11 having a substantially vertical driven shaft 12 projecting downwardly therefrom. The carriage 10 has wheels 13 at the four corners thereof.

To the lower end of the power driven shaft 12 the central portion of a plate or bar 14 is connected so that it will be revolved around the axis of the shaft 12 when the engine 11 is operated. The bar 14 has cutter means 15 at the ends thereof, with deflector means 16 in following relation to the cutter means. The parts 14, 15 and 16 are made from a single strip of steel plate which is formed so as to provide the bar 14 with a central portion 17 and downwardly sloping end portions 18. The plate continues outwardly from the downwardly sloping portions 18 and includes the cutters 15 and the deflectors 16.

Figure 3:
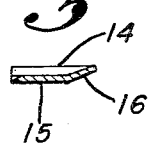
Fig. 3 is a sectional view of the revolving cutter and following deflector, taken as indicated by the line 3—3 of Fig. 1.

The cutters 15 define, when revolved around the axis of shaft 12, a circular approximately horizontal plane, the periphery of this circular plane being defined by the outer ends of the cutters 15. As shown in Fig. 3 the deflectors 16 are bent upwardly at a small angle with relation to the cutters 15; therefore, the upper faces of the deflectors 16 slopes upwardly. A cylindrical or circular wall 20 is arranged approximately concentrically to the shaft 12 and extends upwardly from a circle which is contiguous to the periphery of the circular plane defined by the cutters 15. The lower edge 21 of the circular wall 20 is positioned outside the ends of the cutters 15 in a plane defined by the lower faces of the cutters 15. Therefore, it may be said that the bar 14 and the cutters 15 are enclosed by the circular wall 20.

A top wall 22 extends from the upper portion of the circular wall 20 inwardly toward the axis of rotation of the cutters 15. This wall 22 forms a part of the carriage 10 and supports the engine 11. The top wall 22 is spaced upwardly from the cutters 15 so as to define a cutting chamber or space 23 above the plane in which the cutters revolve. Stationary cutters 24, consisting of approximately rectangular steel plates are arranged in a circle within the peripheral portion of the space 23 above the cutters 15 and the deflectors 16. The stationary cutters 24 extend radially inwardly from the circular wall 20 in vertical planes which approximately intersect the axis of the shaft 12. The lower edges 25 of the stationary cutters 24 lie quite close to the cutters and deflectors 15 and 16.

Considering that the mower, by application of force applied to its handle 28, is being moved forwardly in the direction of the arrow 29, Fig. 1, the top level of the grass to be cut might be as indicated by the dotted line 30. The action of the mower will be to cut off the upper portions of the grass stems, down to the level indicated by the dotted line 31 which lies in or close to the horizontal plane defined by the lip 21 of the circular wall 20. The cut residual grass lying directly below the top wall 22, in spaced relation thereto acts as a closure for the lower part of the space 23. The revolving bar 14, cutters 15 and deflectors 16 act upon the materials in the chamber 23 until they are reduced to such fine form that they may sift down between the stems and leaves of the uncut residual grass. Until the cuttings and leaves are reduced to such fine form, they will remain within the chamber 23 and be subjected to the cutting action of the revolving members. The cutters 15 and the bar 14 will tend to cause the materials to revolve in the chamber 23 and the deflectors 16 will tend to throw them upwardly. However, this revolving of the materials will be stopped in the peripheral portion of the chamber 23 by the vanes or cutters 24 so that they may then drop down in the spaces between the cutters 24 into the path of movement of the revolving cutters 15.

We claim:

1. In a mulching lawnmower: a carriage adapted to be moved along the turf, said carriage having a top wall and a side wall extending down from the periphery thereof so as to define a mulching chamber open at the bottom, the lower edge of said side wall defining an approximately horizontal plane spaced from the turf; power means on the carriage having an approximately vertical shaft extending downwardly through the central portion of said top wall; a rotatable member connected to the lower portion of said shaft; cutters on the outer portions of said rotatable member in close proximity to said horizontal plane and revolvable around the axis of said shaft with the extremities thereof close to said lower edge of said side wall; deflector means on said rotatable member in following relation to said cutters, said deflector means being adapted to urge cuttings upwardly into said mulching chamber; and a plurality of stationary cutters connected to said carriage in a circle within the peripheral portion of said mulching chamber and consisting of upright walls extending inwardly from said side wall with the lower edges thereof above and in close proximity to said deflector means.

2. In a mulching lawnmower: a carriage adapted to be moved along the turf, said carriage having a top wall and a side wall extending down from the periphery thereof so as to define a mulching chamber open at the bottom, the lower edge of said side wall defining an approximately horizontal plane spaced from the turf; power means on the carriage having an approximately vertical shaft extending downwardly through the central portion of said top wall; a rotatable member connected to the lower portion of said shaft; cutters on the outer portions of said rotatable member in close proximity to said horizontal plane and revolvable around the axis of said shaft with the extremities thereof close to said lower edge of said side wall; deflector means on said rotatable member in following relation to said cutters, said deflector means being adapted to urge cuttings upwardly into said mulching chamber; and a plurality of stationary cutters arranged in a circle within the peripheral portion of said mulching chamber, said stationary cutters comprising substantially vertical plates extending downwardly from the peripheral portion of said top wall of said carriage and radially inwardly from said side wall, said plates having cutting edges above and in close proximity to the path of movement of said deflector means.

3. In a mulching lawnmower: a carriage adapted to be moved along the turf, said carriage having a top wall and a side wall extending down from the periphery thereof so as to define a mulching chamber open at the bottom, the lower edge of said side wall defining an approximately horizontal plane spaced from the turf; power means on the carriage having an approximately vertical shaft extending downwardly through the central portion of said top wall; a diametral bar connected to the lower portion of said shaft; cutters on the outer portions of said bar in close proximity to said horizontal plane and revolvable around the axis of said shaft with the extremities thereof close to said lower edge of said side wall; deflector means on said bar in following relation to said cutters, said deflector means being adapted to urge cuttings upwardly into said mulching chamber; and a plurality of stationary cutters arranged in a circle within the peripheral portion of said mulching chamber, said stationary cutters comprising substantially vertical plates extending downwardly from the peripheral portion of said top wall of said carriage and radially inwardly from said side wall, said plates having cutting edges above and in close proximity to the path of movement of said deflector means.

References Cited in the file of this patent

UNITED STATES PATENTS

| 2,734,327 | Whitney | Feb. 14, 1956 |
| 2,737,003 | Beers | Mar. 6, 1956 |

FOREIGN PATENTS

| 164,542 | Australia | Aug. 10, 1955 |